United States Patent [19]
Arpin

[11] Patent Number: 4,656,005
[45] Date of Patent: Apr. 7, 1987

[54] PROTECTIVE PRODUCTS FOR TREATING FRESH CONCRETE OR MORTAR TO PREVENT EXCESSIVE EVAPORATION, PROCESS FOR PREPARING SUCH PRODUCTS, AND TREATED FRESH CONCRETE OR MORTAR

[75] Inventor: René Arpin, Lyons, France

[73] Assignee: Rhone-Poulenc Specialities Chimiques, France

[21] Appl. No.: 798,160

[22] Filed: Nov. 15, 1985

Related U.S. Application Data

[63] Continuation of Ser. No. 472,221, Mar. 4, 1983, abandoned.

[30] Foreign Application Priority Data

Mar. 9, 1982 [FR] France ................. 82 03899

[51] Int. Cl.$^4$ .................. B01J 11/18; A23L 1/00
[52] U.S. Cl. ...................... 422/43; 252/383; 524/8; 524/7; 427/421
[58] Field of Search ........................... 422/43

[56] References Cited

U.S. PATENT DOCUMENTS 2,344,578  3/1944  Whitesides ............. 524/399
3,043,790  7/1962  Sanders ................. 524/8
3,228,907  1/1966  Eash .................... 524/3
3,239,479  3/1966  Roenicke et al. ......... 524/8
3,354,169  11/1967 Shafer et al. ........... 524/8
3,832,223  8/1974  Wohl ................... 427/421
4,214,053  7/1980  Porter .................. 521/70
4,374,670  2/1983  Slocombe ............... 524/460
4,376,176  3/1983  Wilson .................. 524/7

FOREIGN PATENT DOCUMENTS 44-18754  8/1969  Japan ................... 524/8

Primary Examiner—Richard D. Lovering
Assistant Examiner—T. J. Wallen
Attorney, Agent, or Firm—Finnegan, Henderson, Farabow, Garrett & Dunner

[57] ABSTRACT

A protective product for treating fresh concrete or mortar. The products are a mixture of (a) an aqueous dispersion A of a film-forming synthetic polymer (the synthetic polymer is compatible with fresh concrete or mortar) having little or no permeability to water vapor with (b) at least one coagulant for the film-forming synthetic polymer when in the presence of calcium ions. The coagulant is introduced in the form of an aqueous or aqueous alcoholic solution and/or by means of an aqueous wax emulsion and/or by means of an aqueous dispersion B of a synthetic polymer which is slightly permeable or impermeable to water. The aqueous dispersion B is prepared by polymerization in the presence of the coagulant. When applied by spraying to the surface of fresh mortar, the products form a continuous waterproof film, which is readily removed by peeling.

23 Claims, No Drawings

PROTECTIVE PRODUCTS FOR TREATING FRESH CONCRETE OR MORTAR TO PREVENT EXCESSIVE EVAPORATION, PROCESS FOR PREPARING SUCH PRODUCTS, AND TREATED FRESH CONCRETE OR MORTAR

This application is a continuation of application Ser. No. 472,221 filed Mar. 4, 1983 abandoned.

The object of the present invention is to provide (a) a protective product for fresh concrete or mortar, which product contains an aqueous dispersion of a film-forming synthetic polymer, in particular, a film-forming styrene-butadiene copolymer, (b) a process for preparing such product, (c) a process for applying the product to form a protective film on the surface of fresh concrete or mortar and (d) treated fresh concrete or mortar, i.e., concrete or mortar containing on the surface thereof a film formed from the protective product.

Fresh concrete or mortar has to be protected for a certain time after mixing to prevent excessive evaporation of water. Excessive loss of water can result in incomplete hydration of the concrete or mortar, reducing mechanical strength and leading to cracks caused by excessive contraction after setting.

Means used heretofore for retaining water in concrete or mortar consist of products which are sprayed on fresh materials to form a continuous, impermeable film removable by peeling or brushing, thus permitting subsequent application of paint.

Such products usually are based on (a) resins, waxes or paraffins, in aqueous emulsion; (b) natural or synthetic resins, waxes or paraffins dissolved in petroleum solvents; or (c) chlorinated rubber.

Such products, however, are difficult to remove and/or cause hygiene problems. Specifically, although generally effective against desiccation, products involving organic solutions present vapor inhalation risks to users and are also difficult to remove.

The aqueous emulsions of resins penetrate into the surface layer of the concrete or mortar, resulting in a film adhered to the support and thus very difficult to remove. The aqueous wax emulsions are likewise difficult to remove, either by peeling or brushing.

The inventor has discovered protective products, useful in aqueous media, which impart particularly good impermeability to fresh concrete or mortar, and are also very easily removed by peeling. The protective products which are the object of the invention are a mixture of (a) an aqueous dispersion A of a film-forming synthetic polymer which has little or no water vapor permeability and is compatible with fresh concrete or mortar with (b) at least one coagulant for the film-forming synthetic polymer when in the presence of calcium ions, the coagulant being introduced in the form of an aqueous or aqueous-alcoholic solution and/or by means of an aqueous wax emulsion and/or by means of an aqueous dispersion B of a synthetic polymer having little or no water-permeability. The aqueous dispersion B is prepared by polymerization in the presence of the coagulant.

The term "compatible with concrete or mortar" means that the synthetic polymer of the aqueous dispersion A does not contain protective colloids which are insoluble in water at a very alkaline pH (12, for example) and/or in the presence of calcium ions. Such synthetic polymer can diffuse at the surface of concrete or mortar.

A synthetic polymer is considered to have little permeability to water vapor if the permeability to water vapor is less than 5 g/m$^2$/24 h/mm at 25° C., according to ASTM Standard 96635.

Representative aqueous dispersions A of synthetic polymer include aqueous dispersions of styrene-butadiene copolymer containing at least 50% styrene. Such dispersions are prepared by conventional processes of aqueous emulsion polymerization in an acid medium in the presence of a mixture of anionic emulsifiers which are stable in an acid medium and non-ionic emulsifiers.

The quantity of butadiene present in the copolymer is chosen so that the aqueous dispersion A of copolymer is film-forming at the temperature of application and drying of the protective product, i.e., a film is formed equally well from as low as below 0° C. to as high as more than 40° C.

The aqueous dispersion of styrene-butadiene can contain 40–55% by weight dry matter of styrene-butadiene copolymer having a styrene/butadiene weight ratio between 50/50 and 65/35, preferably, between 54/46 and 62/38. The copolymer has a mean particle diameter between 0.1 and 0.2$\mu$.

Representative anionic and non-ionic emulsifiers include alkyl sulfates, alkylsulfonates, arylsulfates, arylsulfonates, sulfosuccinates, alkali metal alkyl phosphates, polyethoxylated fatty acids, polyethoxylated alkylphenols, polyethoxylated fatty alcohols, etc.

As used herein, the term coagulant includes all agents which coagulate film-forming synthetic polymers when the said polymers are in the presence of calcium ions of the fresh concrete or mortar. Preferably coagulants include surfactants or protective colloids which are insoluble in water in the presence of calcium ions. Representative coagulants include the alkali salts of saturated or unsaturated aliphatic acids containing 8–18 carbon atoms, preferably, 12–18 carbon atoms. Specific coagulants include potassium, sodium or lithium oleate or laurate. Potassium laurate and potassium oleate are particularly preferred.

The coagulants are introduced in aqueous or aqueous-alcoholic solution and/or by means of an aqueous wax emulsion and/or by means of an aqueous dispersion B of a synthetic polymer which has little or no water vapor permeability.

Waxes which can be utilized in the form of an aqueous emulsion according to the invention include polyethylene waxes, paraffin waxes of petroleum origin, saturated microcrystalline waxes of petroleum origin, waxes containing montan wax, etc. The useful waxes have a relatively high melting point, i.e., they do not melt when exposed to the sun. To facilitate dispersion of the wax particles in hot water, it is preferred to use waxes having a melting point greater than 50° C. and less than 100° C.

The waxes can be emulsified in water by mixing them in the molten state with the coagulant, possibly with an added anionic, non-ionic and/or cationic emulsifier, followed by incorporation of the mixture, after homogenization, into water. For example, the mixture is slowly incorporated into water having a temperature generally between 50° and 90° C., the temperature of the water being at least equal to the melting point of the wax.

The aqueous wax emulsion thus obtained can contain 10–55% by weight dry matter of particles having a mean diameter generally less than 1$\mu$.

Aqueous dispersions B of synthetic polymer having little or no permeability to water vapor and able to act as support for the utilization of the coagulant include dispersions of butadienestyrene copolymer having more than 20% butadiene. These dispersions are prepared by conventional processes of aqueous emulsion polymerization in the presence of the coagulant, with the possible addition of an anionic and/or non-ionic emulsifier.

The aqueous dispersion of butadiene-styrene copolymer can contain 40–55% by weight dry matter of butadiene/styrene copolymer having a butadiene/styrene weight ratio between 95/5 and 20/80, preferably, between 90/10 and 35/65, and also having a mean particle diameter between 0.1 and 0.3μ.

The protective product forming the object of the invention advantageously contains the following quantities of constituents, the amount of each constituent, with the exception of wax, being expressed as weight % with respect to the weight of protective product:
- 30–99.9%, preferably, 30–99.5%, more preferably 45–99.7% and most preferably 45–85%, of aqueous dispersion A of film-forming synthetic polymer,
- at least 0.1%, preferably, 0.3–0.8%, of coagulant,
- 0–69.9%, preferably, 0 to 54.7%, more preferably, 15–45%, of aqueous dispersion B of synthetic polymer, and
- 0–20%, preferably 1–4%, of wax, the amount of wax being expressed as weight dry matter of wax with respect to the total weight dry matter of polymer contained in the protective product, i.e., the total weight dry matter of polymer contained in the aqueous dispersions A and B.

The protective product according to the invention may contain fine fillers such as pigments, thus enabling the treated concrete or mortar surfaces to be marked and to reflect a part of the light rays at the level of the film formed by application of the protective product, thus avoiding overheating of the concrete or mortar surfaces. Illustrative pigments include titanium oxide, amorphous sodium silicoaluminates etc. The pigments can be utilized in amounts of 0.5–5 wt. % with respect to the weight of the protective product.

Antigel products, such as diethylene glycol and 1,2-propanediol can be utilized in an amount between 2 and 8% of the weight of the protective product to obtain compositions having a low freezing point and being reversible to gel.

The present invention includes a process of preparing the protective products described above. The process comprises mixing, preferably while maintaining the proportions indicated above of the various constituents, (a) the aqueous dispersion A of film-forming synthetic polymer with (b) the coagulant, the coagulant being present in aqueous or aqueous-alcoholic solution and/or in an aqueous wax emulsion and/or in an aqueous dispersion B of synthetic polymer. Various fine fillers or antigel products may be included in the mixing step.

The invention also includes a process for forming a protective film on the surface of fresh concrete or mortar comprising the step of applying to the surface of the concrete or mortar the protective product. The invention also includes a fresh concrete or mortar, the concrete or mortar containing on the surface thereof a film formed from the protective product.

An object of the present invention is to utilize the protective products to treat fresh concrete or mortar. The treatment can be effected in a particularly simple manner by spraying, for example, by an air gun, the product onto the fresh concrete or mortar. After application, the product forms a continuous impermeable film which can be removed from the treated surface after several hours by simple peeling.

The following examples are illustrative only and do not limit the scope and spirit of the invention.

PREPARATION OF THE MORTARS

The mortars tested are prepared as follows:

In a mixer according to the French Standard NF.P 15–411 there is prepared at 20° C. a mixture of:

(a) artificial Portland cement of class 55 (according to French Standard NF.P 15–301) having the following characteristics:
  (i) BLAINE specific surface (French Standard NF.P 15–442) of 3,500 $cm^2/g$; and
  (ii) start of setting on pure paste (French Standard NF.P 15–431) of 2 hrs. 40 min;
(b) normal sand (according to French Standard NF.P 15–403); and
(c) water.

PREPARATION AND STORAGE OF SAMPLES TO BE TREATED

Two metallic molds are used, each having depth as a principal characteristic. The first has a depth of 1.3 cm and the second a depth of 5 cm.

The two molds are filled with mortar, then weighed and stored for one hour at 20° C. and 50% relative humidity.

The protective product to be tested is then applied with an air gun to the surface of the mortars. The molds are then immediately placed, after being weighed, in a ventilated oven at 38° C. and 30% relative humidity for 72 hours (Standards ASTM D.C. 156–65 and C. 309–58).

EFFECTIVENESS OF THE PROTECTIVE PRODUCT

The impermeability conferred by the product tested can be estimated by forming the following ratios:

(a) total water eliminated/initial water.

Initial water is measured at the start of storage (i.e., one hour after the application of the treatment product). Total water eliminated is measured at the end of drying; and (b) water necessary for hydration/initial water. It is estimated that the water necessary for hydration corresponds to 25% of the weight of cement used.

The impermeability conferred can also be estimated by measuring the quantity of water (in grams) evaporated per $cm^2$ of treated mortar surface during drying (i.e., during 72 hours at 38° C.).

EXAMPLES 1 THROUGH 3

Measurements of evaporation of water were made on three types of mortars, the composition of which is given in Table I, which were not treated with a protective product.

The results are given in Table I'.

EXAMPLES 4 THROUGH 9

A protective product is prepared by mixing:

(a) 70 parts by weight of an aqueous dispersion A of a film-forming styrene-butadiene copolymer having the following characteristics:
emulsifiers: sodium alkylsulfonate, oxyethylenated alkylphenol;

dry extract: 50% by weight;
styrene/butadiene by weight: 60/40;
viscosity (Brookfield RVT at 50 r.p.m.): 75±25 mPa.s;
particle diameter: 0.16±0.03μ;
surface tension: 35±1 dynes/cm;
minimum film-forming temperature: below 0° C.; and
pH: 7±0.5; and (b) 30 parts by weight of an aqueous dispersion (denoted "B") of butadiene-styrene copolymer polymerized in the presence of potassium laurate and having the following characteristics:
amount of potassium laurate: 1.8 wt. %;
dry extract: 50% by weight;
butadiene/styrene by weight: 90/10;
viscosity (Brookfield RVT at 50 r.p.m.): 45 mPa.s;
pH: 12.5;
surface tension: 50-55 dynes/cm; and
particle diameter: 0.15-0.3μ; and (c) 10 parts by weight of an aqueous wax emulsion based on montan wax, having the following characteristics:
amount of potassium laurate: 11 wt. % with respect to the dry wax;
dry extract: 26.5 wt. %; and
particle diameter: below 1μ.

The wax utilized possessed:
a drop point of about 80° C.;
an acid number of the order of 15-20; and
and a saponification number of about 130-160.

The wax was emulsified by mixing with 11% with respect to the weight of the wax of potassium laurate in aqueous solution of 28% concentration, with gentle agitation at 90° C., followed by slow incorporation, after homogenization, of the mixture into 333 wt. %, with respect to the wax, of water brought to a temperature of 90°-95° C.; and (d) 2 parts by weight of a synthetic amorphous sodium silicoaluminate sold commercially by Rhone-Poulenc under the name of ZEOLEX 24.

The performance of the protective product thus obtained is measured at two different concentrations of the treatment product, the concentrations being expressed as numbers of grams of protective product applied per m² of treated surface on the three types of mortars tested in Examples 1-3.

Various application rates of protective product on various mortar compositions are made as shown in Table I and the results of measurements of impermeability are shown in Table I'.

EXAMPLE 10

A protective product is prepared by mixing:
(a) 99.5 parts by weight of aqueous dispersion A of the styrene-butadiene copolymer described in Examples 4-9, and
(b) 0.5 parts by weight of potassium laurate in the form of an aqueous-alcoholic solution containing 28 wt. % of laurate.

EXAMPLE 11

A protective product is prepared by mixing:
(a) 89.5 parts by weight of aqueous dispersion A of the styrene-butadiene copolymer described in Examples 4-9,
(b) 10 parts of the wax emulsion described in Examples 4-9, corresponding to about 0.28 parts by weight of potassium laurate, and
(c) 0.5 parts by weight of potassium laurate in the form of a 28 wt. % aqueous-alcoholic solution.

EXAMPLE 12

A protective product is prepared by mixing:
(a) 70 parts by weight of an aqueous dispersion A of the styrene-butadiene described in Examples 4-9,
(b) 30 parts by weight of aqueous dispersion B of butadiene-styrene copolymer described in Examples 4-9, which corresponds to 0.27 parts of potassium laurate, and
(c) 0.5 parts by weight of potassium laurate in the form of a 28 wt. % aqueous-alcoholic solution.

EXAMPLE 13

A protective product is prepared by mixing:
(a) 99.5 parts by weight of an aqueous dispersion A of the styrene-butadiene copolymer described in Examples 4-9, and
(b) 0.5 parts by weight of potassium oleate in the form of a 25 wt. % aqueous alcoholic solution.

EXAMPLE 14

A protective product is prepared by mixing:
(a) 89.5 parts by weight of an aqueous dispersion A of the styrene-butadiene copolymer described in Examples 4-9,
(b) 10 parts by weight of an aqueous emulsion of montan wax containing about 0.2 parts by weight of potassium oleate (the emulsion of wax has about a 20% dry extract and was prepared using an aqueous alcoholic solution of potassium oleate with a concentration of about 25 wt. % of oleate), and
(c) 0.5 parts by weight of potassium oleate in the form of a 25 wt. % aqueous alcoholic solution.

The performances of the protective products obtained in Examples 10-14 are measured on the type of mortar tested in Example 9 and at the concentration level utilized in Example 9 (see Table I). The results of the measurements of impermeability are shown in Table I'.

The ease of peeling after 72 hours of the treated mortar of Examples 4-14 is shown in Table II. A scale of 1 to 5 has been defined. Level 5 corresponds to a product which, while adhering sufficiently to the mortar to withstand removal by the weather (wind, rain), is very easily peelable. Level 1 corresponds to a product which is difficult to remove by peeling.

EXAMPLE 15

For comparison purposes, the impermeability and peelability results obtained by utilizing a commercial product, based on unsaturated resins derived from petroleum, in a solution of aliphatic and heavy aromatic hydrocarbons, are given in Tables I' and II.

It is observed that the impermeability conferred is good but that the resin scales off. Further, this commercial product exposes users to the risks of inhalation of organic solvents.

TABLE I

| Ex. | Protective product weight per unit surface, g/m² | Mortars (composition) | | Mold depth cm |
|---|---|---|---|---|
| | | Cement/sand by weight | Water/cement % by weight | |
| 1 | | 1/3 | 48 | 1.3 |
| 2 | | 1/3 | 46 | 5 |
| 3 | | 1/2 | 40 | 5 |
| 4 | 150 | 1/3 | 48 | 1.3 |

TABLE I-continued

| Ex. | Protective product weight per unit surface, g/m² | Mortars (composition) Cement/sand by weight | Water/cement % by weight | Mold depth cm |
|---|---|---|---|---|
| 5 | 300 | 1/3 | 48 | 1.3 |
| 6 | 150 | 1/3 | 46 | 5 |
| 7 | 300 | 1/3 | 46 | 5 |
| 8 | 150 | 1/2 | 40 | 5 |
| 9 | 300 | 1/2 | 40 | 5 |
| 10 | 300 | 1/2 | 40 | 5 |
| 11 | 300 | 1/2 | 40 | 5 |
| 12 | 300 | 1/2 | 40 | 5 |
| 13 | 300 | 1/2 | 40 | 5 |
| 14 | 300 | 1/2 | 40 | 5 |
| 15 | 300 | 1/2 | 40 | 5 |

TABLE I'

| | Effectiveness of the protective product | | |
|---|---|---|---|
| Ex. | Total water eliminated initial water % by weight | Water for hydration initial water % by weight | Evaporation g/cm² |
| 1 | 60 | 52 | 0.16 |
| 2 | 14.5 | 54 | 0.155 |
| 3 | 15 | 62.5 | 0.176 |
| 4 | 30 | 52 | 0.07 |
| 5 | 26 | 52 | 0.06 |
| 6 | 7.8 | 54 | 0.07 |
| 7 | 6.2 | 54 | 0.06 |
| 8 | 6.2 | 62.5 | 0.058 |
| 9 | 4.4 | 62.5 | 0.04 |
| 10 | 5.9 | 62.5 | 0.06 |
| 11 | 5.0 | 62.5 | 0.05 |
| 12 | 5.0 | 62.5 | 0.05 |
| 13 | 5.9 | 62.5 | 0.06 |
| 14 | 5.0 | 62.5 | 0.05 |
| 15 | 4.4 | 62.5 | 0.04 |

TABLE II

| Product of Example | Ease of peeling |
|---|---|
| 4 | 5 |
| 5 | 5 |
| 6 | 5 |
| 7 | 5 |
| 8 | 5 |
| 9 | 5 |
| 10 | 3 |
| 11 | 4 |
| 12 | 4 |
| 13 | 3 |
| 14 | 4 |
| 15 | 1 (scales off) |

I claim:

1. A protective product for fresh concrete or mortar consisting essentially of a mixture of:
   (a) an aqueous dispersion A of a film-forming synthetic polymer having little or no permeability to water vapor and being compatible with fresh concrete or mortar; with
   (b) at least one coagulant for said film-forming synthetic polymer when in the presence of calcium ions, said coagulant being insoluble in water in the presence of calcium ions and being introduced in the form of one or more of (1) an aqueous or aqueous-alcoholic solution, or (2) an admixture with an aqueous wax emulsion, or (3) an admixture with an aqueous dispersion B of a synthetic polymer having little or no permeability to water vapor, said aqueous dispersion B being prepared by polymerization in the presence of said coagulant, said mixture forming a peelable film after application to fresh concrete or mortar.

2. A product according to claim 1, wherein said aqueous dispersion A of synthetic polymer is an aqueous dispersion of styrene-butadiene copolymer containing at least 50% by weight of styrene.

3. A product according to claim 1 or 2, wherein said wax in said aqueous emulsion has a melting point in the range between 50° C. and 100° C.

4. A product according to claim 2, wherein said copolymer is obtained by aqueous emulsion polymerization in an acid medium of a mixture of styrene and butadiene in the presence of a mixture of (a) an anionic emulsifier which is stable in acid medium, and (b) a nonionic emulsifier.

5. A product according to claim 2, wherein said aqueous dispersion A contains 40-55% by weight dry matter of styrenebutadiene copolymer, said copolymer having a styrene/butadiene weight ratio between 50/50 and 65/35 and a mean particle diameter between 0.1 and 0.2μ.

6. A product according to claim 5, wherein the styrenebutadiene weight ratio of the styrene-butadiene copolymer present in the aqueous dispersion A is between 54/46 and 62/38.

7. A product according to claim 1, 2, 4, 5 or 6, wherein said coagulant is an alkali salt of a saturated or unsaturated aliphatic acid containing 8-18 carbon atoms.

8. A product according to claim 7, wherein said coagulant is an alkali salt of a saturated or unsaturated aliphatic acid containing 12-18 carbon atoms.

9. A product according to claim 7, wherein said coagulant is potassium laurate or potassium oleate.

10. A product according to claim 1, wherein said aqueous wax emulsion contains 10-55 % by weight dry matter of particles of average diameter less than 1μ.

11. A product according to claim 1, wherein said wax is brought into aqueous emulsion by means of said coagulant.

12. A product according to claim 1, wherein said wax is brought into emulsion by means of said coagulant and a member selected from an anionic, nonionic and cationic emulsifier and a mixture thereof.

13. A product according to claim 1, wherein said aqueous dispersion B of synthetic polymer is an aqueous dispersion of a butadiene-styrene copolymer, said copolymer containing at least 20% by weight of butadiene, and said copolymer being obtained by polymerization in aqueous emulsion of a mixture of butadiene and styrene in the presence of said coagulant.

14. A product according to claim 13, wherein said polymerization of said butadiene-styrene copolymer occurs in the presence of said coagulant and a member selected from an anionic and nonionic emulsifier and a mixture thereof.

15. A product according to claim 1, wherein said aqueous dispersion B contains 40-55% by weight dry matter of a butadienestyrene copolymer having a weight ratio of butadiene/styrene between 20/80 and 95/5 and a mean particle diameter between 0.1 and 0.3μ.

16. A product according to claim 15, wherein the weight ratio of butadiene/styrene of said butadiene-styrene copolymer is between 35/65 and 90/10.

17. A product according to claim 1, containing the following quantities of constitutents, the quantities of each constituent, with the exception of wax, being expressed in % by weight with respect to the weight of the protective product:
(a) from 30 to 99.9% of said aqueous dispersion A of said film-forming synthetic polymer,
(b) at least 0.1% of said coagulant,
(c) from 0 to 69.9% of said aqueous disperion B of synthetic polymer, and
(d) from 0 to 20% of wax in said wax emulsion, the quantity of wax being expressed as weight dry matter of wax with respect to the total weight dry matter of polymer contained in said protective product.

18. A product according to claim 17, containing:
(a) from 45 to 99.7% of said aqueous dispersion A of said film-forming synthetic polymer,
(b) from 0.3 to 0.8% of said coagulant,
(c) from 0 to 54.7% of aqueous dispersion B of synthetic polymer, and
(d) from 0 to 20% of wax.

19. A product according to claim 18, containing from 45 to 85% of said aqueous dispersion A.

20. A protective product for fresh concrete or mortar comprising a mixture of the following constituents, the quantitites of each constituent, with the exception of wax, being expressed in % by weight with respect to the weight of the protective product.

21. A process for the preparation of the product of claim 1 or 20, comprising the step of mixing said aqueous dispersion A of said film-forming polymer with said coagulant, said coagulant being introduced in the form of one or more of (1) an aqueous or aqueous-alcoholic solution, or (2) an admixture with an aqueous wax emulsion, or (3) an admixture with an aqueous dispersion B of a synthetic polymer.

22. A process for forming a protective film on the surface of a fresh concrete or mortar comprising the step of applying to the surface of said concrete or mortar the protective product of claim 1 or 20 said protective product forming a film on said surface.

23. A fresh concrete or mortar, said concrete or mortar containing on the surface thereof a film formed from the protective product of claim 1 or 20.

* * * * *